United States Patent
Possanzini

(10) Patent No.: US 12,487,300 B2
(45) Date of Patent: Dec. 2, 2025

(54) DETECTION OF OFF-LABEL USE OF A MAGNETIC RESONANCE IMAGING COIL

(71) Applicant: KONINKLIJKE PHILIPS N.V., Eindhoven (NL)

(72) Inventor: Cecilia Possanzini, Nijmegen (NL)

(73) Assignee: Koninklijke Philips N.V., Eindhoven (NL)

( * ) Notice: Subject to any disclaimer, the term of this patent is extended or adjusted under 35 U.S.C. 154(b) by 99 days.

(21) Appl. No.: 18/027,213

(22) PCT Filed: Sep. 15, 2021

(86) PCT No.: PCT/EP2021/075259
§ 371 (c)(1),
(2) Date: Mar. 20, 2023

(87) PCT Pub. No.: WO2022/063640
PCT Pub. Date: Mar. 31, 2022

(65) Prior Publication Data
US 2024/0103105 A1 Mar. 28, 2024

(30) Foreign Application Priority Data
Sep. 22, 2020 (EP) ..................................... 20197357

(51) Int. Cl.
*G01R 33/34* (2006.01)
*G01R 33/28* (2006.01)
(Continued)

(52) U.S. Cl.
CPC ..... *G01R 33/34084* (2013.01); *G01R 33/288* (2013.01); *G01R 33/3692* (2013.01);
(Continued)

(58) Field of Classification Search
CPC ............ G01R 33/34084; G01R 33/288; G01R 33/3692; G01R 33/543; G06V 40/10; G06V 2201/03; G06V 10/764; A61B 5/055
See application file for complete search history.

(56) References Cited

U.S. PATENT DOCUMENTS 10,156,621 B2 12/2018 Zhai et al.
2013/0271129 A1 10/2013 Kess
(Continued)

FOREIGN PATENT DOCUMENTS

CN 206651870 U 11/2017
EP 3530177 A1 8/2019
(Continued)

OTHER PUBLICATIONS

International Search Report and Written Opinion from PCT/EP2021/075259 mailed Dec. 8, 2021.

*Primary Examiner* — G.M. A Hyder

(57) ABSTRACT

Disclosed herein is a medical system comprising: —a memory storing machine executable instructions; —a computational system, wherein execution of the machine executable instructions causes the computational system to perform a mismatch check comprising: —receive posture recognition system data, wherein the posture recognition system data comprises a set of subject coordinates and a set of coil coordinates described using a current coordinate system, wherein the set of subject coordinates are descriptive of anatomical features of a subject, wherein the set of coil coordinates are descriptive of a coil location of a magnetic resonance imaging coil, wherein coil data comprising a predefined range of coil positioning coordinates referenced to the anatomical features is associated with the magnetic resonance imaging coil; —determine an allowed range of coil coordinates by mapping the predefined range of
(Continued)

coil positioning coordinates to the current coordinate system using the set of subject coordinates and the anatomical features; and —provide a warning signal in case of a mismatch between the set of coil coordinates and the allowed range of coil coordinates.

20 Claims, 2 Drawing Sheets

(51) Int. Cl.
    *G01R 33/36*      (2006.01)
    *G01R 33/54*      (2006.01)
    *G06V 40/10*      (2022.01)

(52) U.S. Cl.
    CPC ........... *G01R 33/543* (2013.01); *G06V 40/10* (2022.01); *G06V 2201/03* (2022.01)

(56) References Cited

U.S. PATENT DOCUMENTS

| | | |
|---|---|---|
| 2013/0279779 A1 | 10/2013 | Darrow et al. |
| 2014/0055127 A1 | 2/2014 | Biber et al. |
| 2014/0055132 A1 | 2/2014 | Biber et al. |
| 2016/0178713 A1 | 6/2016 | Fischer et al. |
| 2021/0153767 A1* | 5/2021 | Dai .................... G01R 33/3415 |

FOREIGN PATENT DOCUMENTS

| | | |
|---|---|---|
| JP | 2010119744 A | 6/2010 |
| WO | 2014044635 A1 | 3/2014 |
| WO | 2014064553 A1 | 5/2014 |

* cited by examiner

DETECTION OF OFF-LABEL USE OF A MAGNETIC RESONANCE IMAGING COIL

CROSS REFERENCE TO RELATED APPLICATIONS

This application is a U.S. national phase application of International Application No. PCT/EP2021/075259 filed on Sep. 15, 2021, which claims the benefit of EP Application Serial No. 20197357.5 filed on Sep. 22, 2020 and is incorporated herein by reference.

FIELD OF THE INVENTION

The invention relates to medical magnetic resonance imaging, in particular to the detection of the position of a magnetic resonance imaging coil relative to the body of a subject to be imaged.

BACKGROUND OF THE INVENTION

Magnetic resonance imaging (MM) systems make use of dedicated radio-frequency (RF) receive (Rx) and transmit/receive (Tx/Rx) coils that are often optimized for different anatomies and clinical needs. A particular RF coil may be designed and labelled for a specific set of intended applications and anatomies (e.g. knee, cardiac, abdomen, etc.). An MRI control system may automatically identify a connected RF coil, retrieve a specification of its intended use, report the specification on a user interface (UI), and include the specification in applicable instructions for use.

Medical MRI systems may also be equipped with a posture recognition system or subsystem for determining the posture of a subject to be imaged using the RF coil. A posture recognition system may comprise a camera installed in the examination area and an image processing unit adapted for detecting the subject's posture in an output image of the camera. Approaches for detecting a posture include template-based recognition and trained machine learning models such as trained neural networks.

United States patent application U.S. 2014/0 055 127 A1 discloses a method and a device for identifying a position of a local coil of a magnetic resonance imaging scanner relative to a position of a patient couch. The device includes at least one reading unit that is configured to determine a position of at least one label at the local coil relative to the at least one reading unit. The device also includes a position determination apparatus that is configured to determine the position of the patient couch relative to the magnetic resonance imaging scanner. The device includes a position determination apparatus that is configured to determine the position of the local coil relative to the patient couch based on the determined position of the at least one label and the determined position of the patient couch.

SUMMARY OF THE INVENTION

The invention provides for a medical system, a method, and a computer program in the independent claims. Embodiments are given in the dependent claims.

Modern medical MRI systems may have a capability of recognizing an RF coil that is connected to the system for acquiring a magnetic resonance image (MR image) of a subject. However, MRI systems may be unable to detect the part of the subject's body that is placed in the connected coil. It may be possible to use an RF coil off-label, i.e., for imaging a body portion that is not included in the coil's specification or certification. This may adversely affect the image quality and/or the safety of the subject.

To determine whether an RF coil is placed at the specified anatomical region of a subject, embodiments of the invention may operate in an environment that comprises a medical MRI system and a posture recognition system. The posture recognition system may provide posture recognition system data that are descriptive of a posture of a subject and of a location of an RF coil of the MRI system. A posture recognition system may comprise one or more image sensors or cameras. Preferably, the sensing unit of a posture recognition system is capable of resolving a configuration of the human body in three dimensions. This may be achieved by different approaches such as stereo-camera or multiple-camera imaging, triangulation techniques, structured-light 3D scanning, time-of-flight imaging, interferometry, and/or coded-aperture image acquisition. In contrast to magnetic resonance image data (MR image data or MRI data) that may be generated using an MRI coil as described herein, the data generated by any image sensor(s) of a posture recognition system will be referred to as camera image data.

A posture recognition system may further comprise hardware and/or software adapted for performing image analysis tasks that allow for recognizing the posture of a human body in the camera image data. Such equipment may comprise one or more a graphics processor, a CPU, memory, and a suitable analysis engine that may be implemented in hardware, software, or both, such as, without limitation, classifiers such as a trained machine-learning model (e.g., a multilayer perceptron feed-forward neural network), unsupervised learning approaches such as self-organizing maps, or fuzzy C-means and K-means clustering algorithms; image segmentation approaches such as fuzzy subsets data fusion with defuzzication or contour-based shape descriptors with a projection histogram, background subtraction, least-square estimation, Kalman filtering, star-skeleton extraction, and many more.

A posture recognition system may thus be implemented using a computer such as the computational system or a separate, dedicated computing system equipped with an interface for receiving camera image data from a suitable (preferably, 3-D) image sensor or camera. In an example, the posture recognition system makes use of a camera to acquire camera image data of both the subject and the RF coil and processes the camera image data to determine a set of subject coordinates describing the posture of the subject and a set of coil coordinates describing the location of the RF coil in the image.

A set of coil data may also be available in the environment. The coil data may be assigned to the particular RF coil that is currently connected to the MRI system. The coil data may define a range of coil positioning coordinates within a standard coordinate system that describes a relation of the coil coordinates to predefined anatomical features of a theoretical model subject. The predefined anatomical features may be identified with anatomical features of the subject that were recognized by the posture recognition system. In an example, the posture recognition system data contains types and locations of certain joints of the subject.

The identification of anatomical features in the current coordinate system of the subject and the standard coordinate system of the model subject may allow embodiments of the invention to map the standard coordinate system to the current coordinate system. In this way, it may be possible to perform a mismatch check, i.e., to decide whether there is an agreement between the observed position of the connected RF coil and its corresponding coil positioning coordinates or not.

In one aspect, the invention provides for a medical system comprising:

a memory storing machine executable instructions;

a computational system, wherein execution of the machine executable instructions causes the computational system to perform a mismatch check comprising:

receive posture recognition system data, wherein the posture recognition system data comprises a set of subject coordinates and a set of coil coordinates described using a current coordinate system, wherein the set of subject coordinates are descriptive of anatomical features of a subject, wherein the set of coil coordinates are descriptive of a coil location of a magnetic resonance imaging coil, wherein coil data comprising a predefined range of coil positioning coordinates referenced to the anatomical features is associated with the magnetic resonance imaging coil;

determine an allowed range of coil coordinates by mapping the predefined range of coil positioning coordinates to the current coordinate system using the set of subject coordinates and the anatomical features; and provide a warning signal in case of a mismatch between the set of coil coordinates and the allowed range of coil coordinates.

The memory may comprise a built-in component of the computational system, an exchangeable medium that is readable by the computational system, and/or an online memory that can be accessed by the computational system via a communications network. The computational system may comprise a processor and further computing hardware as specified herein. The computational system may comprise, may be part of, or may be communicatively coupled to a control unit adapted for controlling the magnetic resonance imaging coil (MRI coil) and any further components of an MRI system. The computational system may comprise one or more computer systems, wherein each computer system comprises an independent processor and, if applicable, is communicatively coupled to the other computer systems of the computational system. This may include distributed computing approaches such as a computing network, a processor grid, and/or cloud computing resources.

In an example, the software implementing the mismatch check (the implementing software) may be executable independent of the software controlling the imaging process and its preparation (the MRI control software). In other examples, the mismatch check may be integrated in the MRI control software; or may be added to the MRI control software as an extension, plug-in or the like; or may be embedded into the MRI control software by execution of a software update, upgrade, patch, or the like.

Without restriction, the posture recognition system data may be obtained from camera image data that may be recorded using one or more cameras, wherein usage of multiple cameras may have the advantage of allowing for a three-dimensional posture recognition. However, a single-camera technique providing three-dimensional camera image data (3-D camera) may also be used. Determining the posture recognition system data based on three-dimensional camera image data may have the advantage of allowing a determination of three-dimensional point(s) in the set of subject coordinates and in the set of coil coordinates with an improved accuracy.

For instance, the set of subject coordinates may be obtained using a known approach for posture recognition from an image. It may be advantageous to determine the subject's posture by estimating coordinates of the subject's joints. In this case, the anatomical features may comprise the joints. However, any other selection of anatomical features may be convenient for recognizing the subject's posture. The set of subject coordinates may be obtained by suitable techniques such as pattern matching or execution of a trained machine-learning model.

A way of implementing a posture recognition system is to have a trained neural network that labels the location of the subject's joints in the camera image data. For example, a neural network can be trained using labeled training images that are labeled with the position of a set of chosen subject joints. The trained neural network is then able to label the location of the chosen subject joints when the camera image data is input into it. The same trained neural network can be trained to provide the location of the set of coil coordinates.

The subject's posture can be defined by the location of the subject's joints. The allowed range of coil coordinates can then be defined by mapping the predefined range of coil positioning coordinates with respect to the subject's joints to the current coordinate system using the set of subject coordinates and the anatomical features.

The set of coil coordinates may also be obtained from the camera image data. For this purpose, the RF coil may feature one or more predefined patterns, tags, or codes that may be detected by the camera(s). In an example, the housing of the RF coil bears a label such as a sticker with one or more predefined patterns printed on it. The coil's position and orientation may then be obtained, e.g., by matching the predefined pattern(s) to the camera image data, thus detecting size, orientation, deformation of the patterns, and if multiple predefined features are present, their spatial arrangement.

The output of the camera(s) or other sensing device(s) used as an input to the posture recognition system producing the posture recognition system data may be interpreted in terms of known spatial scales that may be characteristic of the respective camera(s) or sensing device(s). For instance, a mapping may be known that describes the appearance of an equidistant lattice in camera image data produced by a given camera of the system when recording an image of the lattice in a predefined spatial configuration. Such correspondence may be used to define a current coordinate system that may be overlaid to the camera image data of the subject and the RF coil to obtain a quantitative description of the respective positions of the RF coil and the anatomical features of the subject.

A specification of an intended use of the RF coil, i.e., one or more anatomical features or regions of which the RF coil is permitted or intended to be used for recording magnetic resonance image data (MR image data or MRI data), is assumed to be available as part of a set of coil data assigned to the given RF coil attached to the MRI system. Such specification may be expressed as a range of coil positioning coordinates in a theoretical coordinate system that is referred to as the standard coordinate system. The standard coordinate system may describe positions relative to a model body of a theoretical subject. The point of origin of the standard coordinate system may coincide with an anatomical feature of the model body. The orientation of the standard coordinate system may also be defined in terms of an anatomical feature of the model body.

It may be beneficial if at least one anatomical feature of the model body corresponds to one of the anatomical features described by the set of subject coordinates (the recorded anatomical features). This may simplify the mapping between the standard coordinate system and the current coordinate system for determining the allowed range of coil coordinates. A larger number of correspondences of the recorded anatomical features to those of the theoretical subject may improve the accuracy of the determination of the allowed range of coil coordinates.

It may be beneficial to determine multiple allowed ranges of coil coordinates to discover a mismatch in different (linearly independent) coordinates. In an example, the current coordinate system comprises three linearly independent coordinates, such that the anatomical features and the magnetic resonance imaging coil (the MRI coil) may be located in three dimensions, and there may be one allowed range of coil coordinates determined for each of the three dimensions. The three corresponding allowed ranges of coil coordinates may then define a volume or box within which a positioning of the MRI coil is acceptable.

A mismatch between the set of coil coordinates and the allowed range of coil coordinates may be detected in various ways. A criterion for classifying a match from a mismatch may relate to one or more of the coil coordinates in the set of coil coordinates being outside the boundaries of the allowed range of coil coordinates. An exemplary criterion may specify a mismatch if one of the coil coordinates lies outside of the corresponding allowed range of coil coordinates. Another exemplary criterion may combine multiple linearly independent coordinates to define, e.g. a cylindrical volume of permissible coil locations of the MRI coil. A further exemplary criterion may add an uncertainty range to each allowed range of coil coordinates to take account of possible imprecisions in the determination of the allowed range of coil coordinates. Another exemplary criterion may account for situations where a deviation in one dimension compared to the other dimensions is acceptable, by defining no allowed range of coil coordinates for coordinate representing the acceptable dimension. Similarly, an exemplary criterion may specify that a mismatch is given only if more than one coordinates is outside of the corresponding allowed range of coil coordinates. A further exemplary criterion may consider a deviating orientation of the MRI coil as a mismatch, wherein the corresponding predefined range of coil positioning coordinates describes an angular range within which the orientation of the MRI coil is required.

The provision of the warning signal may cause one or more different advantageous effects. For instance, the warning signal may cause the computational system and/or the MRI system to store, e.g., a log file entry descriptive of the detection of the mismatch between the set of coil coordinates and the allowed range of coil coordinates. Alternative of additional outputs caused by the warning signal may comprise an output on a graphical user interface, which may comprise, without limitation, one or more of a description of the mismatching coordinate(s), a timestamp, a magnitude of deviation(s) between the set of coil coordinates and the allowed range of coil coordinates, a description of a correct placement of the MRI coil, a description about steps to perform to move the MRI coil to the prescribed position and/or orientation, etc. Such information may likewise be included in a log file entry. The warning signal may cause an acoustic warning. The warning signal may alternatively or additionally influence the control flow of the MRI system, such as, without limitation, preventing or stopping an imaging scan, setting a different magnetic field strength to be provided by the MRI coil during an imaging scan, requiring a user to confirm ignoring the mismatch for the next MRI scan, or any other action that may be suitable to account for the detected mismatch.

Embodiments of the invention may be beneficial because they may contribute to discover an incorrect placement of an MRI coil at an early stage, preferably before an MRI scan is started. Embodiments may thus prevent adverse effects of incorrect placement, such as a reduced image quality of the MR image data and/or an excessive specific absorption rate (SAR). Embodiments may thus contribute to the physical safety of a subject to be imaged. For example, an MRI coil approved for abdominal MM scans of adult humans may cause an unacceptably high SAR if the abdominal MRI coil were used for imaging a baby. In another example, an MRI coil approved for knee imaging is placed around a torso. The MRI system may then calculate the SAR assuming that a knee is in the scanner and not a torso. Since the actual SAR depends on the tissue characteristics (i.e. conductivity, dielectric constant, etc.), the delivered whole-body and local SAR might exceed the displayed SAR and even the standard safety limits. In a local transmit/receive (TR) coil, however, the SAR would be mainly delivered to the region around the knee and the power absorption may be negligible in the body. In this respect, the operator might prefer to use a smaller local TR coil to scan the patient. However, because the SAR depends on the tissue physical properties coil of the tissue where the RF power is deposited, the local and SAR displayed by the system may be not correct and might exceed the displayed value or even the safety limits.

In an embodiment, the execution of the machine executable instructions further causes the computational system to:
receive a coil identifier descriptive of the magnetic resonance imaging coil; and
receive the coil data in response to querying a magnetic resonance imaging coil database using the coil identifier.

This may increase the probability of a correct identification of the MRI coil. The coil identifier may be obtained in many ways. For example, the MRI coil may comprise a memory chip that is read out each time the MRI coil is connected to the MRI system. Another possibility may be to include identifying information (e.g., a bar code, a QR code, an alphanumerical code, etc.) on a label of the MRI coil that may be captured and interpreted by the posture recognition system.

In another embodiment, the medical system further comprises a magnetic resonance imaging system adapted for acquiring medical image data of the subject using the magnetic resonance imaging coil in response to receiving a predefined start signal from the computational system, the execution of the machine executable instructions further causing the computational system to perform the provision of the warning signal in case of a mismatch between the set of coil coordinates and the allowed range of coil coordinates before transmitting the start signal to the magnetic resonance imaging system.

Providing the warning signal before starting a scan may allow an operator of the magnetic resonance imaging system (MRI system) for correcting the position and/or the orientation of the MRI coil. This may contribute to an improved image quality of the MR image data and/or a higher probability of keeping the SAR experienced by the subject during the scan within prescribed boundaries.

In another embodiment, the execution of the machine executable instructions further causes the computational system to provide the start signal only in case of a match between the set of coil coordinates and the allowed range of coil coordinates.

This may prevent the performance of an MRI scan with an off-label use of the MRI coil as described herein. Such off-label use may pose the subject to be imaged at an increased risk of incurring an SAR that exceeds a safety limit. Hence, suppressing the start signal in case of a detected off-label use may improve the physical safety of the subject. Moreover, an MRI scan providing MR image data with a low image quality may be prevented. Signs of a low image quality may include a low contrast, a low sharpness and/or a too low or too high brightness of the scanned image. A low-quality scan may have to be repeated to obtain MR image data with an improved image quality, which may also increase the subject's risk of incurring a high total SAR.

In another embodiment, the machine executable instructions further causes the computational system to obtain a predicted specific absorption rate calculated to be experienced by the subject in a posture described by the set of subject coordinates if the magnetic resonance imaging system executes a planned magnetic resonance imaging scan using the magnetic resonance imaging coil at the coil location, the coil data further comprising a specific absorption rate safety value specific to the magnetic resonance imaging coil, the execution of the machine executable instructions further causing the computational system to provide the start signal only if the predicted specific absorption rate does not exceed the specific absorption rate safety value.

Specific absorption rate (SAR) is a measure of the rate at which energy is absorbed per unit mass by a human body when exposed to a radio frequency (RF) electromagnetic field, as it may occur during an imaging scan of the subject using the detected MRI coil. The predicted specific absorption rate (predicted SAR) may be determined by the computational system or any other computing system used by or communicatively connected to the computational system and/or to any control unit of the MRI system to which the MRI coil is attached. The predicted SAR may be determined, e.g., using a tissue model of the subject's anatomical region that is determined by the posture recognition system to be covered by the MRI coil at the detected coil location. The specific absorption rate safety value (SAR safety value) may be predetermined by medical safety regulations or a medical indication that may be applicable or specific to the subject to be imaged. Preventing an MRI scan if the predicted SAR exceeds the SAR safety value may increase the physical safety of the subject by preventing incurrence of a too high dose of (e.g. thermal) energy per unit mass into the subject's tissue.

In another embodiment, the medical system further comprises a user interface, the provision of the warning signal comprising transmitting the warning signal to the user interface, the warning signal comprising the predicted specific absorption rate and the specific absorption rate safety value, the execution of the machine executable instructions further causing the computational system, if the predicted specific absorption rate does not exceed the specific absorption rate safety value, to submit the start signal only in response to receiving an override confirmation signal from the user interface in response to the transmission of the warning signal to the user interface.

The transport of the predicted SAR and the SAR safety value to the user interface may allow for displaying the predicted SAR and the SAR safety value to an operator of the medical system and/or the corresponding MRI system. This may give the operator the possibility to compare the predicted SAR to the SAR safety value and thus assess whether a possibly increased SAR incurrence during the planned MRI scan is exceptionally acceptable for the present subject. The operator may have the option to ask the subject for consent to the possible exceedance of the SAR safety value during the planned MRI scan and to cause transmission of the override confirmation signal only if the subject agrees to the exception. A user interface may comprise output devices such as a display, a loudspeaker, etc., and an input device such as a keyboard, a mouse, etc.

In another embodiment, the predefined range of coil positioning coordinates is referenced to the anatomical features of a model subject, the coil data further comprising a compliant specific absorption rate determined to be experienced by the model subject if the magnetic resonance imaging system executes a predefined magnetic resonance imaging reference scan of the model subject using the magnetic resonance imaging coil within the predefined range of coil positioning coordinates, the machine executable instructions further causing the computational system to:

obtain a predicted specific absorption rate calculated to be experienced by the subject in a posture described by the set of subject coordinates if the magnetic resonance imaging system executes a planned magnetic resonance imaging scan using the magnetic resonance imaging coil at the coil location; and provide the start signal only if the predicted specific absorption rate does not exceed the compliant specific absorption rate.

The predicted specific absorption rate (predicted SAR) may be determined by the computational system or any other computing system used by or communicatively connected to the computational system and/or to any control unit of the MRI system to which the MRI coil is attached. The predicted SAR may be determined, e.g., using a tissue model of the subject's anatomical region that is determined by the posture recognition system to be covered by the MRI coil at the detected coil location. The compliant specific absorption rate (compliant SAR) may be a predetermined known value such as an empirical, average, typical and/or experimentally determined reference SAR value that may be regularly and reasonably expected if the MRI coil is used in full compliance with its specification and/or certification. Preventing an MRI scan if the predicted SAR exceeds the compliant SAR may increase the physical safety of the subject by preventing incurrence of a too high dose of (e.g. thermal) energy per unit mass into the subject's tissue.

In another embodiment, the medical system further comprises a user interface, the provision of the warning signal comprising transmitting the warning signal to the user interface, the warning signal comprising one or more of:

information characterizing a difference between the set of coil coordinates and the allowed range of coil coordinates;

information characterizing a difference between an anatomical reference feature and an anatomical target feature of the subject, the coil data comprising an intended use identifier indicating the anatomical reference feature as being permitted to be imaged by a magnetic resonance imaging system using the magnetic resonance imaging coil within the predefined range of coil positioning coordinates, the execution of the machine executable instructions further causing the computational system to identify, using the posture recognition system data, the anatomical target feature of the subject as being imaged in case that the magnetic resonance imaging coil would be used for acquiring medical MR image data with the magnetic resonance imaging coil being located as described by the set of coil coordinates and the subject being located as described by the set of subject coordinates; and information descriptive of a repositioning of the magnetic resonance imaging coil required to solve the mismatch.

Said one or more characterizing and/or descriptive information such transported by the warning signal, shortly called the "mismatch information" in the following, may be displayed to an operator of the medical system and/or the MRI system using the user interface. This may facilitate the operator's decision about an adequate response to the detected mismatch. Without limitation, information characterizing a difference between the set of coil coordinates and the allowed range of coil coordinates may comprise one or more indications of distance (e.g., length in millimeters) between a mismatching pair of corresponding coordinates in the set of coil coordinates and the allowed range of coil coordinates.

An intended use identifier may comprise a human-readable or encoded indication of the anatomical reference feature(s) that are intended to be imaged using the given MRI coil. For example, an MRI coil designed for imaging a knee/a thorax may have assigned an intended use identifier respectively specifying "knee", "thorax" as the applicable anatomical reference feature. The intended use identifier may be obtained, e.g., as part of the coil data and/or from an MRI coil database as specified herein. Assuming that the magnetic resonance imaging coil would be used for acquiring medical MR image data with the magnetic resonance imaging coil being located as described by the set of coil coordinates and the subject being located as described by the set of subject coordinates, the posture recognition system, the medical system and/or the MRI system may identify and include in the posture recognition system data the anatomical target feature as the subject's anatomical feature that would most probably be imaged in the detected spatial configuration of the subject and the MRI coil. If there is no anatomical reference feature corresponding to the detected anatomical target feature, the anatomical reference feature and/or the anatomical target feature may be displayed to the operator using the user interface.

Similarly, information descriptive of a repositioning of the magnetic resonance imaging coil required to solve the mismatch may include a specification of one or more length distances about which the MRI coil should be moved in order to achieve a correct placement of the MRI coil in the allowed range of coil coordinates, a specification of the anatomical reference feature corresponding to the allowed range of coil coordinates, and/or safety measures and/or further operating instructions to be observed when repositioning the MRI coil to the allowed range of coil coordinates.

In another embodiment, the execution of the machine executable instructions further causes the computational system to:
transmit information descriptive of the anatomical reference feature to the user interface; and
repeat the mismatch check in response to receiving a repositioning confirmation from the user interface.

This may ensure that the required relocation of the MRI coil has been performed correctly.

In another embodiment, the set of subject coordinates comprises joint location coordinates for the subject. As the joints of a subject convey the spatial configuration of the subject's body, this may facilitate a correct determination of the subject's posture.

In another embodiment, the medical system further comprises a posture recognition system adapted for providing the posture recognition system data to the computational system. A posture recognition system may have available dedicated computing resources that may operate independent of the computational system and/or any control unit of the used MRI system. This may allow for implementing a posture recognition technique with a high requirement for computational resources compared to those of the computational system and/or the control unit(s) of the MRI system.

In another embodiment, the medical system further comprises the magnetic resonance imaging coil database. This may reduce communication delay times compared to an MRI coil database that is shared across a communications or computing network.

In another aspect, the invention provides for a method of medical imaging, the method comprising:
receiving posture recognition system data, wherein the posture recognition system data comprises a set of subject coordinates and a set of coil coordinates described using a current coordinate system, wherein the set of subject coordinates are descriptive of anatomical features of a subject, wherein the set of coil coordinates are descriptive of a coil location of a magnetic resonance imaging coil;
receiving a coil identifier descriptive of the magnetic resonance imaging coil; receiving coil data in response to querying a magnetic resonance imaging coil database using the coil identifier, wherein the coil data comprises a predefined range of coil positioning coordinates referenced to the anatomical features;
determining an allowed range of coil coordinates by mapping the predefined range of coil positioning coordinates to the current coordinate system using the set of subject coordinates and the anatomical features; and
providing a warning signal in case of a mismatch between the set of coil coordinates and the allowed range of coil coordinates.

In another aspect, the invention provides for a computer program comprising machine executable instructions for execution by a computational system controlling a medical system, wherein execution of the machine executable instructions causes the computational system to:
receive posture recognition system data, wherein the posture recognition system data comprises a set of subject coordinates and a set of coil coordinates described using a current coordinate system, wherein the set of subject coordinates are descriptive of anatomical features of a subject, wherein the set of coil coordinates are descriptive of a coil location of a magnetic resonance imaging coil;
receive a coil identifier descriptive of the magnetic resonance imaging coil;
receive coil data in response to querying a magnetic resonance imaging coil database using the coil identifier, wherein the coil data comprises a predefined range of coil positioning coordinates referenced to the anatomical features;
determine an allowed range of coil coordinates by mapping the predefined range of coil positioning coordinates to the current coordinate system using the set of subject coordinates and the anatomical features; and provide a warning signal in case of a mismatch between the set of coil coordinates and the allowed range of coil coordinates.

It is understood that one or more of the aforementioned embodiments of the invention may be combined as long as the combined embodiments are not mutually exclusive.

As will be appreciated by one skilled in the art, aspects of the present invention may be embodied as an apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

Any combination of one or more computer readable medium(s) may be utilized. The computer readable medium may be a computer readable signal medium or a computer readable storage medium. A 'computer-readable storage medium' as used herein encompasses any tangible storage medium which may store instructions which are executable by a processor or computational system of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the computational system of the computing device. Examples of computer-readable storage media include, but are not limited to: a floppy disk, a magnetic hard disk drive, a solid state hard disk, flash memory, a USB thumb drive, Random Access Memory (RAM), Read Only Memory (ROM), an optical disk, a magneto-optical disk, and the register file of the computational system. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer device via a network or communication link. For example, data may be retrieved over a modem, over the internet, or over a local area network. Computer executable code embodied on a computer readable medium may be transmitted using any appropriate medium, including but not limited to wireless, wire line, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

'Computer memory' or 'memory' is an example of a computer-readable storage medium. Computer memory is any memory which is directly accessible to a computational system. 'Computer storage' or 'storage' is a further example of a computer-readable storage medium. Computer storage is any non-volatile computer-readable storage medium. In some embodiments computer storage may also be computer memory or vice versa.

A 'computational system' as used herein encompasses an electronic component which is able to execute a program or machine executable instruction or computer executable code. References to the computational system comprising the example of "a computational system" should be interpreted as possibly containing more than one computational system or processing core. The computational system may for instance be a multi-core processor. A computational system may also refer to a collection of computational systems within a single computer system or distributed amongst multiple computer systems. The term computational system should also be interpreted to possibly refer to a collection or network of computing devices each comprising a processor or computational systems. The machine executable code or instructions may be executed by multiple computational systems or processors that may be within the same computing device or which may even be distributed across multiple computing devices.

Machine executable instructions or computer executable code may comprise instructions or a program which causes a processor or other computational system to perform an aspect of the present invention. Computer executable code for carrying out operations for aspects of the present invention may be written in any combination of one or more programming languages, including an object oriented programming language such as Java, Smalltalk, C++ or the like and conventional procedural programming languages, such as the "C" programming language or similar programming languages and compiled into machine executable instructions. In some instances, the computer executable code may be in the form of a high-level language or in a pre-compiled form and be used in conjunction with an interpreter which generates the machine executable instructions on the fly. In other instances, the machine executable instructions or computer executable code may be in the form of programming for programmable logic gate arrays.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It is understood that each block or a portion of the blocks of the flowchart, illustrations, and/or block diagrams, can be implemented by computer program instructions in form of computer executable code when applicable. It is further under stood that, when not mutually exclusive, combinations of blocks in different flowcharts, illustrations, and/or block diagrams may be combined. These computer program instructions may be provided to a computational system of a general purpose computer, special purpose computer, or other programmable data processing apparatus to produce a machine, such that the instructions, which execute via the computational system of the computer or other programmable data processing apparatus, create means for implementing the functions/acts specified in the flowchart and/or block diagram block or blocks.

These machine executable instructions or computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The machine executable instructions or computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A 'user interface' as used herein is an interface which allows a user or operator to interact with a computer or computer system. A 'user interface' may also be referred to as a 'human interface device.' A user interface may provide information or data to the operator and/or receive information or data from the operator. A user interface may enable input from an operator to be received by the computer and may provide output to the user from the computer. In other words, the user interface may allow an operator to control or manipulate a computer and the interface may allow the computer to indicate the effects of the operator's control or manipulation. The display of data or information on a display or a graphical user interface is an example of providing information to an operator. The receiving of data through a keyboard, mouse, trackball, touchpad, pointing stick, graphics tablet, joystick, gamepad, webcam, headset, pedals, wired glove, remote control, and accelerometer are all examples of user interface components which enable the receiving of information or data from an operator.

A 'hardware interface' as used herein encompasses an interface which enables the computational system of a computer system to interact with and/or control an external computing device and/or apparatus. A hardware interface may allow a computational system to send control signals or instructions to an external computing device and/or apparatus. A hardware interface may also enable a computational system to exchange data with an external computing device and/or apparatus. Examples of a hardware interface include, but are not limited to: a universal serial bus, IEEE 1394 port, parallel port, IEEE 1284 port, serial port, RS-232 port, IEEE-488 port, Bluetooth connection, Wireless local area network connection, TCP/IP connection, Ethernet connection, control voltage interface, MIDI interface, analog input interface, and digital input interface.

A 'display' or 'display device' as used herein encompasses an output device or a user interface adapted for displaying images or data. A display may output visual, audio, and or tactile data. Examples of a display include, but are not limited to: a computer monitor, a television screen, a touch screen, tactile electronic display, Braille screen, Cathode ray tube (CRT), Storage tube, Bi-stable display, Electronic paper, Vector display, Flat panel display, Vacuum fluorescent display (VF), Light-emitting diode (LED) displays, Electroluminescent display (ELD), Plasma display panels (PDP), Liquid crystal display (LCD), Organic light-emitting diode displays (OLED), a projector, and Head-mounted display.

Magnetic Resonance (MR) data is defined herein as being the recorded measurements of radio frequency signals emitted by atomic spins using the antenna of a Magnetic resonance apparatus during a magnetic resonance imaging scan. Magnetic resonance data is an example of medical MR image data. A Magnetic Resonance Imaging (MRI) image or MR image is defined herein as being the reconstructed two- or three-dimensional visualization of anatomic data contained within the magnetic resonance imaging data. This visualization can be performed using a computer.

BRIEF DESCRIPTION OF THE DRAWINGS

In the following preferred embodiments of the invention will be described, by way of example only, and with reference to the drawings in which.

DETAILED DESCRIPTION OF THE EMBODIMENTS

Like numbered elements in these figures are either equivalent elements or perform the same function. Elements which have been discussed previously will not necessarily be discussed in later figures if the function is equivalent.

Figure 1:
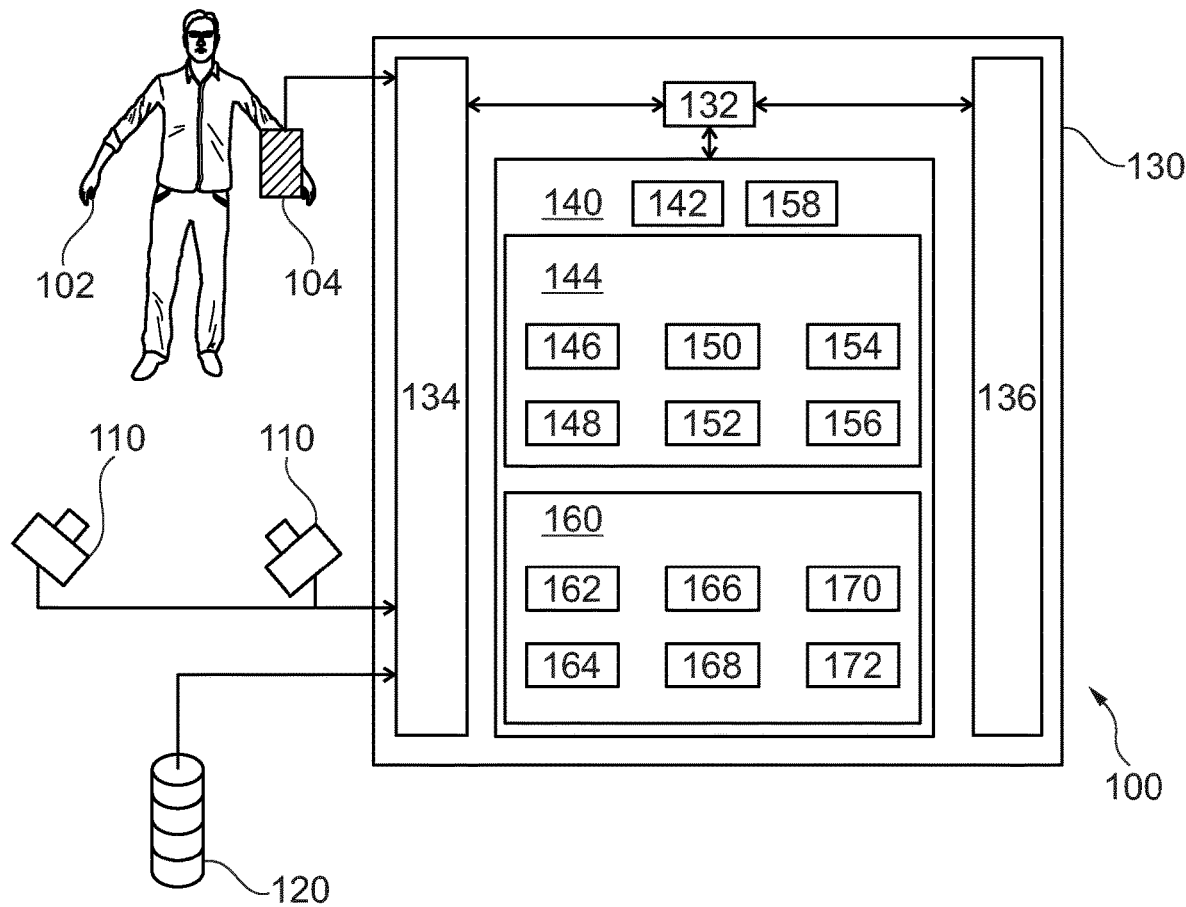
FIG. 1 illustrates an example of a medical system.

FIG. 1 illustrates an example of a medical system 100. The medical system 100 shown in FIG. 1 is understood to be purely illustrative. In particular, components that are shown in FIG. 1 as coupled or integrated may likewise be implemented as separate or independent, and components that are shown as separate or independent may likewise be implemented as coupled or integrated; components that are shown as hardware may likewise be implemented as software, and components that are shown as software may likewise be implemented as hardware; shown components may likewise be implemented in a modified manner, be replaced by a different component, or be missing in alternative embodiments; likewise, further components may be added to the shown configuration.

The medical system 100 may comprise a computational system 130 equipped with a processor 132, a hardware or network interface 134, a user interface 136, and a memory 140. Input/output devices such as a display device, a loudspeaker, a keyboard, and/or a mouse that may be connected to the user interface 136 are not shown.

A magnetic resonance imaging coil (MRI coil) 104 is shown as connected to the hardware or network interface 134. A 3-D camera system comprising two cameras 110 is also shown as connected to the hardware or network interface 134. A magnetic resonance imaging coil database (coil database) 120 is also shown as connected to the hardware or network interface 134. The coil database 120, and optionally, any further device connected to the computational system 130 may be connected to the hardware or network interface 134 by a local connection (e.g., an electrical or optical cable) or via a communications network (e.g., a cable-borne or wireless network or an uplink to the internet).

A subject 102 is shown near the medical system 100. The MRI coil 104 is shown as covering an anatomical feature of the subject 102. In the example of FIG. 1, the anatomical feature covered by the MRI coil 104 is an elbow of the subject 102. The cameras 110 are shown with an orientation that may allow for acquiring camera image data 148 of the subject 102 and the MRI coil 104. The MRI coil 104 may comprise a radio frequency coil (RF coil), such as a receive coil (Rx coil) or a transmit/receive coil (Tx/Rx coil), that may receive a body part of the subject 102 that may comprise or adjoin one or more of the anatomical features. The MRI coil 104 may be part of an MRI system that may comprise further coils such as a scanner coil adapted for receiving the subject 102 having the RF coil 104 attached to the respective body part and for generating a magnetic gradient field that allows acquiring MR image data of the subject 102 with a desired spatial resolution.

The subject 102, the MRI coil 104, the cameras 110, and possibly, further components of the MRI system and/or the medical system 100 may be located in an examination room. The cameras 110 may be installed or adapted for being positioned at a location of such examination room where the subject 102 having attached the MRI coil 104 can be captured by the cameras 110 simultaneously. The MRI system may further comprise a scanner table adapted for supporting the subject 102 and moving the subject 102 into and out of the bore of the scanner coil.

The cameras 110 may be located at a point of the examination room (e.g., mounted at a wall or ceiling of the examination room, or carried by a stand on the floor of the examination room) or may be attached to a component of the MRI system (e.g., the scanner coil) or the medical system 100. The cameras 110 may have a field of view that allows for capturing the subject 102 and the MRI coil 104 supported by a portion of the scanner table that is outside the bore of the scanner coil. For instance, it may be beneficial to arrange the cameras 110 such that their field of view may capture the MRI coil 104 and one or more anatomical features of the subject 102 adjoining the MRI coil 104 outside the bore of the scanner coil such that subject coordinates 152 may be determined for at least said adjoining anatomical features from the camera image data 148. Likewise, the field of view may be defined such that sufficient space is available for capturing at least a portion of the MRI coil 104 such that all required coil coordinates may be determined from the camera image data 148.

The memory 140 may store various sets of data and instructions. For instance, the memory 140 may store a set of instructions 142 that may cause the medical system 100, if executed by the processor 132, to implement steps of a procedure of preparing and conducting an acquisition of magnetic resonance image data of the subject 102 using the MRI coil 104 (MRI instructions 142). The memory 140 may further store a group 144 of data and instructions related to functions of a posture recognition system (PRS group 144) and a group 160 of data and instructions related to a mismatch check routine (mismatch check group 160).

The MRI instructions 142 may contain a call of one or more sets of posture recognition system instructions (PRS instructions) 146, 150, 154 and a call of one or more sets of mismatch check instructions (MC instructions) 162, 166, 170. The MRI instructions may also perform read and/or write accesses to PRS data 148, 152, 156 in the PRS group 144 and to MC data 164, 168, 172 in the MC group 160. Likewise, elements in the PRS group 144 may be called, read or written by the MC instructions 162, 166, 170, and elements in the MC group 160 may be called, read or written by the PRS instructions 146, 150, 154. The memory 140 may further store a coil identifier 158 that may have been received in response to the connection of the MRI coil 104 to the computational system 130. The PRS instructions 146, 150, 154 and the MC instructions 162, 166, 170 may call instructions of the MRI instructions 142 and may at least have a read access to the coil identifier 158. The Mill instructions 142, the PRS instructions 146, 150, 154, and the MC instructions 162, 166, 170 may have access to the hardware or network interface 134 and the user interface 136.

The MRI coil 104, its connection to the hardware or network interface 134, the MRI instructions 142 and the coil identifier 158 may be regarded as components of an MRI system. The cameras 110, their connection to the hardware or network interface 134, and the PRS instructions 146, 150, 154 may be regarded as components of a posture recognition system. The coil database, its connection to the hardware or network interface 134, and the MC instructions 162, 166, 170 may be regarded as components of a mismatch check system (MC system). The access of the MRI instructions 142, the PRS instructions 146, 150, 154, and the MC instructions 162, 166, 170 to the hardware or network interface 134 and the user interface 136 may be restricted to the respective interface ports used by the MRI system, the PRS system, and the MC system. In this case, instructions assigned to a given system may have to call suitable instructions from one of the other systems if a transmission or receipt of data via an interface port outside the given system is required. Examples are given in the following.

An exemplary usage scenario of the medical system 100 may comprise executing the MRI instructions 142 using the processor 132. At a suitable point of the MRI procedures implemented by the MRI instructions 142, e.g., when the MRI coil 104 has been arranged to cover an anatomical feature of the subject 102 but an MRI scan using the MRI coil 104 has not yet been started, the MRI instructions 142 may contain a call of one or more of the PRS instructions 146, 150, 154 to obtain PRS data 148, 152, 156.

In an example, the MRI instructions 142 comprise a call of camera image data acquisition instructions 146. Execution of the camera image data acquisition instructions 146 may cause the processor 132 to use the cameras 110 to acquire camera image data 148 of the subject 102 and the MRI coil 104.

The MRI instructions 142 or the camera image data acquisition instructions 146 may contain a call of posture recognition instructions 150. Execution of the posture recognition instructions 150 may cause the processor 132 to implement a posture recognition technique, such as one or more of those described herein, that receives at least a part of the camera image data 148 and, in response thereto, provides a set of subject coordinates 152. The set of subject coordinates 152 may be descriptive of anatomical features of the subject 102 as captured in the camera image data 148. Each anatomical feature described by the set of subject coordinates 152 may be assigned to one or more of the identified subject coordinates 152.

The MRI instructions 142 or the posture recognition instructions 150 may contain a call of coil detection instructions 154. Execution of the coil detection instructions 154 may cause the processor 132 to implement a coil detection routine, such as one or more of those described herein, that receives at least a part of the camera image data 148 and, in response thereto, provides a set of coil coordinates 156. The set of coil coordinates 156 may be descriptive of a position and/or an orientation of the MRI coil 104 as captured in the camera image data 148. For instance, each of the position and the orientation of the MRI coil 104 may be described by coil coordinates 156 of a respective two- or three-dimensional vector.

The set of subject coordinates and the set of coil coordinates may be given in a current coordinate system that may reflect geometrical properties of the imaging process of the camera image data 148 by the camera 110 (e.g., optical curvature or bending effects).

Still in the exemplary usage scenario, at a suitable point of the MRI procedures implemented by the MRI instructions 142, e.g., when the PRS instructions 146, 150, 154 have been completed successfully but an MRI scan using the MRI coil 104 has not yet been started, the MRI instructions 142 may contain a call of one or more of the MC instructions 162, 166, 170 to obtain MC data 164, 168, 172.

In an example, the MRI instructions 142 comprise a call of coil data query instructions 162. Execution of the coil data query instructions 162 may cause the processor 132 to transmit the coil identifier 158 to the coil database 120 to query a range 164 of coil positioning coordinates for the MRI coil 104. The range 164 of coil positioning coordinates may be given within a standard coordinate system that describes a relation of the coil coordinates required for the MRI coil 104 to predefined anatomical features of a theoretical model subject. The coil data query instructions 162 may contain a check whether the range 164 of coil positioning coordinates specific to the MRI coil 104 described by the coil identifier 158 is already stored in the memory 140, and may implement the condition to query the database 120 only if the applicable range 164 of coil positioning coordinates cannot be found. The range 164 of coil positioning coordinates may comprise multiple ranges, e.g., one range for each dimension represented by a linearly independent coordinate.

The range 164 of coil positioning coordinates may be descriptive of multiple anatomical features of the model subject where a use of the MRI coil 104 for acquiring MRI data is permitted. For this purpose, the range 164 of coil positioning coordinates may comprise a range 164 of coil positioning coordinates for each coordinate describing a range of permitted use of the MRI coil 104 for one of the permitted anatomical features. In particular, a pair of coordinates describing a range of permitted use for two different anatomical features may have different origins of coordinates that may be specific to the respective anatomical feature. For instance, the range 164 of coil positioning coordinates for an MRI coil 104 that is permitted to be used for two knees and two elbows may comprise four sets of permitted coordinate ranges, wherein each set of permitted coordinate ranges may be assigned to one of the permitted anatomical features, may comprise e.g. three coordinate ranges to express the permitted use of the MRI coil 104 in three dimensions, and may have assigned one origin of coordinates that may be different from each origin of coordinates assigned to any one of the other sets of permitted coordinate ranges. If necessary, the coordinate ranges within a given set of permitted coordinate ranges may be expressed relative to a different available origin of coordinates by calculating the distance between the respective points of origin for each coordinate and adding the respective distance to the respective coordinate.

The MRI instructions 142 or the coil data query instructions 162 may contain a call of coordinate system mapping instructions 166. The coordinate system mapping instructions 166 may be adapted for identifying one or more of the anatomical features of the subject 102 that have been detected and described in the set of subject coordinates 152 by the posture recognition system with corresponding anatomical feature(s) of the model subject, using, e.g., a system of unique descriptors for anatomical features that may be present in the memory 140 or available e.g. via the hardware or network interface 134.

The coordinate system mapping instructions 166 may be adapted for determining (detecting, calculating and/or inferring) common geometry information in the set of subject coordinates and/or derived from the set of subject coordinates in the current coordinate system using the anatomical features. The common geometry information may be present in, calculated and/or inferred from the range 164 of coil coordinates and/or any further available information of the model subject in the standard coordinate system as well. In an example, the coordinate system mapping instructions 166 may cause the processor 132 to calculate a position and an orientation of a particular anatomical feature of the subject 102 and/or positions of two or more anatomical features of the subject 102 and one or more difference vectors between the two or more positions.

Similarly, a position and orientation of the same common geometry information may be obtained, with suitable calculations if necessary, for the theoretical model subject in the standard coordinate system. The common geometry information should be sufficient to calculate a mapping to express the range 164 of coil positioning coordinates in the current coordinate system. In an example, the mapping is expressed by one or more elementary transformation matrices such as a spatial translation, a rotation, and/or a dilation that are capable of transforming the position(s) and orientation(s) of the anatomical feature(s) of the model subject represented by the common geometry information in the standard coordinate system into the corresponding position(s) and orientation(s) of the anatomical feature(s) of the subject 102 represented by the same common geometry information in the current coordinate system.

The coordinate system mapping instructions 166 may then cause the processor 132 to map the range 164 of coil positioning coordinates from the standard coordinate system to the current coordinate system, using the mapping thus determined, to obtain an allowed range 168 of coil coordinates.

The MRI instructions 142 or the coordinate system mapping instructions 166 may contain a call of mismatch check instructions 170. The mismatch check instructions 170 may apply one or more logical criteria for comparing the set of coil coordinates 156 to the allowed range 168 of coil coordinates. In an example, the mismatch check instructions 170 may be configured for detecting a mismatch if one or more of the coil coordinates 156 are outside the corresponding allowed range 168 of coil coordinates. In another example, the mismatch check instructions 170 may be configured for detecting a mismatch if a predefined linear combination of two or more of the coil coordinates 156 are outside the corresponding allowed range 168 of coil coordinates. In another example, the mismatch check instructions 170 may be configured for respecting a tolerance range added to one or more allowed ranges 168 of coil coordinates to account for possible imprecisions in the outputs of the PRS data 148, 152, 156 and/or in the mapping determined by the coordinate system mapping instructions 166.

If the mismatch check instructions 170 result in a determination that there is a mismatch between the coil coordinates 156 and the allowed range 168 of coil coordinates, but the range 164 of coil positioning coordinates indicates that there are further ranges 164 of coil positioning coordinates where a use of the MRI coil 104 for imaging the subject is allowed, the mismatch check instructions 170 may exit the mismatch check routine by calling the coordinate system mapping instructions 166 to determine another mapping for one of the further ranges 164 of coil positioning coordinates, such that a mismatch check can be performed by a subsequent new call of the mismatch check instructions 170 for checking the results obtained for the selected further range 164 of coil positioning coordinates.

If the mismatch check instructions 170 result in a determination that there is a mismatch between the coil coordinates 156 and all allowed ranges 168 of coil coordinates for the given MRI coil 104, the mismatch check instructions 170 may continue by generating and providing a warning signal 172. The warning signal 172 may comprise any information descriptive of the detected mismatch (mismatch information), such as, without limitation, the set of coil coordinates 156, the allowed range(s) 168 of coil coordinates, the camera image data 148, an indicative information of a deviation between the coil coordinates 156 and the allowed range 168 of coil coordinates, a timestamp of acquisition of the camera image data 148, a timestamp of obtainment of a mismatch check result, instructions on how to correct the detected mismatch, the coil identifier, handling and safety instructions for correcting the detected mismatch using the MRI coil 104, etc. The warning signal 172 may be used to cause various effects such as, without limitation, displaying a portion of the mismatch information using the user interface 138, writing a portion of the mismatch information into a log file entry, pausing, halting, branching, or restarting the MRI procedure instructions 142, etc.

Figure 2:
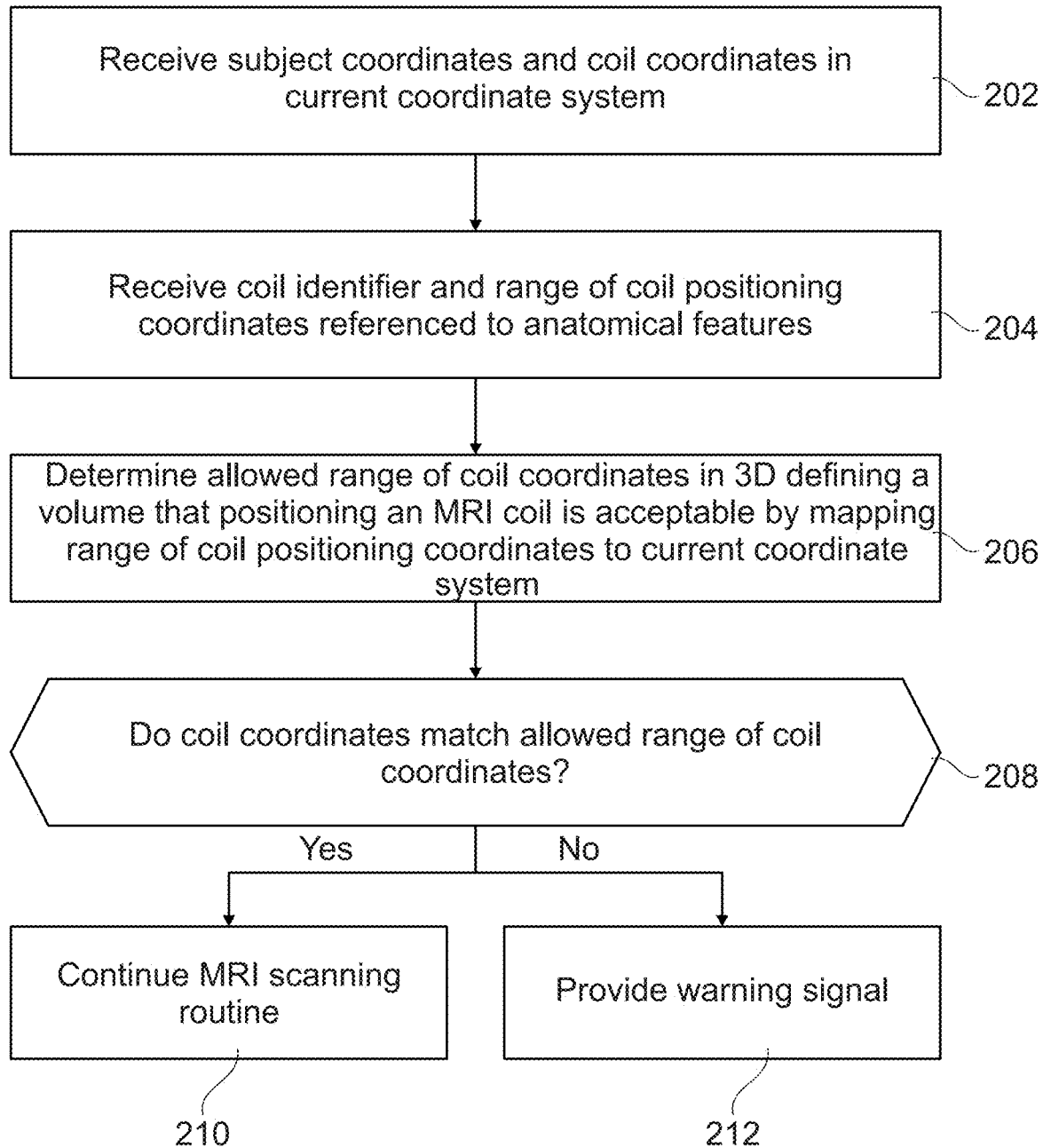
FIG. 2 shows a flow chart which illustrates a method of using the medical system of FIG. 1.

FIG. 2 shows a flow chart which illustrates an exemplary method of using a medical system such as the medical system 100 of FIG. 1. A step 202 comprises receiving posture recognition system data. The posture recognition system data may be determined by analysis of a camera image 144 of the subject 118 and the MRI coil 114. The posture recognition system data may comprise a set of subject coordinates 150 that are descriptive of anatomical features of a subject 118. The posture recognition system data may further comprise a set of coil coordinates 154 that are descriptive of a coil location of a magnetic resonance imaging coil 114. The subject coordinates 150 and the coil coordinates 154 may be given in a current coordinate system associated with the camera image 144.

A step 204 comprises receiving a coil identifier 156 descriptive of the magnetic resonance imaging coil 114. Examples of receiving the coil identifier 156 may include reading out the coil identifier 156 from an internal memory of the MRI coil 114 when it is connected to the MRI system 102, and querying the coil identifier 156 from a coil database using a code of the MRI coil 114 identified in the camera image 144.

Step 204 further comprises receiving coil data 158 in response to querying a magnetic resonance imaging coil database using the coil identifier 156. The coil data 158 may comprise a predefined range of coil positioning coordinates measured relative to one or more of anatomical features of a model subject in a standard coordinate system.

A step 206 comprises determining an allowed range of coil coordinates by mapping the predefined range of coil positioning coordinates to the current coordinate system. This may be done based on an identification of one or more of the detected anatomical features of the subject 118 and their corresponding subject coordinates 150 with the coordinates of one or more corresponding anatomical features of the model subject in the standard coordinate system.

A step 208 comprises evaluating one or more criteria to determine if the detected coil coordinates 154 lie within the allowed range of coil coordinates as determined before. If this is true, the method may proceed with continuing 210 the MRI scanning routine without any influence of the results of steps 202-208. If a mismatch between the set of coil coordinates and the allowed range of coil coordinates is detected, the method may proceed with providing 212 a warning signal that may trigger automatic and/or user-based actions for responding to the detected mismatch appropriately.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

LIST OF REFERENCE NUMERALS 100 medical system
102 subject
104 magnetic resonance imaging coil
110 camera
120 magnetic resonance imaging coil database
130 computational system
132 processor
134 hardware or network interface
136 user interface
140 memory
142 magnetic resonance imaging instructions
144 posture recognition system group
146 camera image data acquisition instructions
148 camera image data
150 posture recognition instructions
152 subject coordinates
154 coil detection instructions
156 coil coordinates
158 coil identifier
160 mismatch check group
162 coil data query instructions
164 range of coil positioning coordinates
166 coordinate system mapping instructions
168 allowed range of coil coordinates
170 mismatch check instructions
172 warning signal

The invention claimed is:
1. A medical system comprising:
a magnetic resonance imaging coil including a memory chip configured to store a coil identifier descriptive of the magnetic resonance imaging coil;
a magnetic resonance imaging system configured to acquire medical image data of a subject using the magnetic resonance imaging coil;

a non-transitory memory configured to store machine executable instructions for performing a mismatch check; and a computational system, wherein execution of the machine executable instructions causes the computational system to:

receive posture recognition system data, wherein the posture recognition system data comprises a set of subject coordinates and a set of coil coordinates described using a current coordinate system, wherein the set of subject coordinates are descriptive of anatomical features of a subject, wherein the set of coil coordinates are descriptive of a coil location of the magnetic resonance imaging coil;

receive the coil identifier by reading the memory chip each time the magnetic resonance imaging coil is connected to the magnetic resonance imaging system;

receive coil data associated with the magnetic resonance imaging coil using the coil identifier, wherein the coil data comprises a predefined range of coil positioning coordinates referenced to the anatomical features;

determine an allowed range of coil coordinates in three dimensions, defining a volume or a box within which a positioning of the magnetic resonance imaging coil is acceptable, by mapping the predefined range of coil positioning coordinates to the current coordinate system using the set of subject coordinates and the anatomical features;

determine whether the set of coil coordinates is within the allowed range of coil coordinates in the current coordinate system;

provide a start signal from the computational system to the magnetic resonance imaging system if the set of coil coordinates is within the allowed range of coil coordinates in the current coordinate system; and provide a warning signal indicating a mismatch between the set of coil coordinates and the allowed range of coil coordinates when the set of coil coordinates is not within the allowed range of coil coordinates.

2. The medical system of claim 1, the execution of the machine executable instructions further causing the computational system to provide the start signal only when the set of coil coordinates is within the allowed range of coil coordinates.

3. The medical system of claim 1, the machine executable instructions further causing the computational system to:

obtain a predicted specific absorption rate calculated to be experienced by the subject in a posture described by the set of subject coordinates if the magnetic resonance imaging system executes a planned magnetic resonance imaging scan using the magnetic resonance imaging coil at the coil location, the coil data further comprising a specific absorption rate safety value specific to the magnetic resonance imaging coil; and provide the start signal only if the predicted specific absorption rate does not exceed the specific absorption rate safety value.

4. The medical system of claim 3, further comprising a user interface, the provision of the warning signal comprising transmitting the warning signal to the user interface, the warning signal comprising the predicted specific absorption rate and the specific absorption rate safety value, the execution of the machine executable instructions further causing the computational system, if the predicted specific absorption rate does not exceed the specific absorption rate safety value, to submit the start signal only in response to receiving an override confirmation signal from the user interface in response to the transmission of the warning signal to the user interface.

5. The medical system of claim 1, the predefined range of coil positioning coordinates being referenced to the anatomical features of a model subject, the coil data further comprising a compliant specific absorption rate determined to be experienced by the model subject if the magnetic resonance imaging system executes a predefined magnetic resonance imaging reference scan of the model subject using the magnetic resonance imaging coil within the predefined range of coil positioning coordinates, the machine executable instructions further causing the computational system to:

obtain a predicted specific absorption rate calculated to be experienced by the subject in a posture described by the set of subject coordinates if the magnetic resonance imaging system executes a planned magnetic resonance imaging scan using the magnetic resonance imaging coil at the coil location; and provide the start signal only if the predicted specific absorption rate does not exceed the compliant specific absorption rate.

6. The medical system of claim 1, further comprising a user interface configured to output the warning signal to an associated user, wherein the warning signal includes at least one:

information characterizing a difference between the set of coil coordinates and the allowed range of coil coordinates;

information characterizing a difference between an anatomical reference feature and an anatomical target feature of the subject, the coil data comprising an intended use identifier indicating the anatomical reference feature as being permitted to be imaged by a magnetic resonance imaging system using the magnetic resonance imaging coil within the predefined range of coil positioning coordinates, the execution of the machine executable instructions further causing the computational system to identify, using the posture recognition system data, the anatomical target feature of the subject as being imaged in case that the magnetic resonance imaging coil would be used for acquiring medical image data with the magnetic resonance imaging coil being located as described by the set of coil coordinates and the subject being located as described by the set of subject coordinates; or information descriptive of a repositioning of the magnetic resonance imaging coil required to solve the mismatch.

7. The medical system of claim 6, the execution of the machine executable instructions further causing the computational system to:

transmit information descriptive of the anatomical reference feature to the user interface; and repeat the mismatch check in response to receiving a repositioning confirmation from the user interface.

8. The medical system of claim 1, the set of subject coordinates comprising joint location coordinates for the subject.

9. The medical system of claim 1, further comprising a posture recognition system configured to provide the posture recognition system data to the computational system.

10. The medical system of claim 1, further comprising a magnetic resonance imaging coil database configured to store the coil data associated with the magnetic resonance imaging coil in association with the coil identifier, wherein the machine executable instructions cause the computational system to receive the coil data associated with the magnetic resonance imaging coil by querying the magnetic resonance imaging coil database using the coil identifier.

11. A method of medical imaging, the method comprising:
receiving posture recognition system data, wherein the posture recognition system data comprises a set of subject coordinates and a set of coil coordinates described using a current coordinate system, wherein the set of subject coordinates are descriptive of anatomical features of a subject, wherein the set of coil coordinates are descriptive of a coil location of a magnetic resonance imaging coil, wherein the magnetic resonance imaging coil includes a memory chip configured to store a coil identifier descriptive of the magnetic resonance imaging coil;
receiving the coil identifier by reading the memory chip each time the magnetic resonance imaging coil is connected to an associated magnetic resonance imaging system;
receiving coil data in response to querying a magnetic resonance imaging coil database using the coil identifier, wherein the coil data comprises a predefined range of coil positioning coordinates referenced to the anatomical features;
determining an allowed range of coil coordinates in three dimensions, defining a volume or a box within which a positioning of the magnetic resonance imaging coil is acceptable, by mapping the predefined range of coil positioning coordinates to the current coordinate system using the set of subject coordinates and the anatomical features;
determining whether the set of coil coordinates is within the allowed range of coil coordinates in the current coordinate system;
providing a start signal from the computational system to the magnetic resonance imaging system if the set of coil coordinates is within the allowed range of coil coordinates in the current coordinate system; and
providing a warning signal indicating a mismatch between the set of coil coordinates and the allowed range of coil coordinates when the set of coil coordinates is not within the allowed range of coil coordinates.

12. The method of claim 11, further comprising:
obtaining a predicted specific absorption rate calculated to be experienced by the subject in a posture described by the set of subject coordinates when the magnetic resonance imaging system executes a planned magnetic resonance imaging scan using the magnetic resonance imaging coil at the coil location, the coil data further comprising a specific absorption rate safety value specific to the magnetic resonance imaging coil; and
providing the start signal only when the predicted specific absorption rate does not exceed the specific absorption rate safety value.

13. A non-transitory computer readable medium storing machine executable instructions for execution by a computational system controlling a medical system, wherein the execution of the machine executable instructions causes the computational system to:
receive posture recognition system data, wherein the posture recognition system data comprises a set of subject coordinates and a set of coil coordinates described using a current coordinate system, wherein the set of subject coordinates are descriptive of anatomical features of a subject, wherein the set of coil coordinates are descriptive of a coil location of a magnetic resonance imaging coil, wherein the magnetic resonance imaging coil includes a memory chip configured to store a coil identifier descriptive of the magnetic resonance imaging coil;
receive the coil identifier by reading the memory chip each time the magnetic resonance imaging coil is connected to an associated magnetic resonance imaging system;
receive coil data in response to querying a magnetic resonance imaging coil database using the coil identifier, wherein the coil data comprises a predefined range of coil positioning coordinates referenced to the anatomical features;
determine an allowed range of coil coordinates in three dimensions, defining a volume or a box within which a positioning of the magnetic resonance imaging coil is acceptable, by mapping the predefined range of coil positioning coordinates to the current coordinate system using the set of subject coordinates and the anatomical features;
determine whether the set of coil coordinates is within the allowed range of coil coordinates in the current coordinate system;
provide a start signal from the computational system to the magnetic resonance imaging system if the set of coil coordinates is within the allowed range of coil coordinates in the current coordinate system; and
provide a warning signal indicating a mismatch between the set of coil coordinates and the allowed range of coil coordinates when the set of coil coordinates is not within the allowed range of coil coordinates.

14. The non-transitory computer readable medium of claim 13, wherein the execution of the machine executable instructions further causes the computational system to:
obtain a predicted specific absorption rate calculated to be experienced by the subject in a posture described by the set of subject coordinates when a planned magnetic resonance imaging scan is executed by a magnetic resonance imaging system using the magnetic resonance imaging coil at the coil location, the coil data further comprising a specific absorption rate safety value specific to the magnetic resonance imaging coil; and
provide a start signal to the magnetic resonance imaging system only when the predicted specific absorption rate does not exceed the specific absorption rate safety value.

15. The non-transitory computer readable medium of claim 14, wherein the warning signal comprises the predicted specific absorption rate and the specific absorption rate safety value, and
wherein the execution of the machine executable instructions further causes the computational system to submit the start signal only in response to receiving an override confirmation signal from a user interface in response to the provision of the warning signal to the user interface if the predicted specific absorption rate does not exceed the specific absorption rate safety value.

16. The non-transitory computer readable medium of claim 13, wherein the predefined range of coil positioning coordinates are referenced to the anatomical features of a model subject, wherein the coil data further comprises a compliant specific absorption rate determined to be experienced by the model subject when a magnetic resonance imaging system executes a predefined magnetic resonance imaging reference scan of the model subject using the magnetic resonance imaging coil within the predefined range of coil positioning coordinates, and
wherein the execution of the machine executable instructions further causes the computational system to:
obtain a predicted specific absorption rate calculated to be experienced by the subject in a posture described by the set of subject coordinates when the magnetic resonance imaging system executes a planned magnetic resonance imaging scan using the magnetic resonance imaging coil at the coil location; and
provide a start signal to the magnetic resonance imaging system only when the predicted specific absorption rate does not exceed the compliant specific absorption rate.

17. A medical system comprising:
a non-transitory memory configured to store machine executable instructions for performing a mismatch check; and
a computational system, wherein execution of the machine executable instructions causes the computational system to:
receive posture recognition system data, wherein the posture recognition system data comprises a set of subject coordinates and a set of coil coordinates described using a current coordinate system, wherein the set of subject coordinates are descriptive of anatomical features of a subject, wherein the set of coil coordinates are descriptive of a coil location of the magnetic resonance imaging coil;
receive a coil identifier by reading a label of the magnetic resonance imaging coil, wherein the coil identifier comprises a bar code, a QR code, or an alphanumerical code on the label on the magnetic resonance imaging coil;
receive coil data associated with the magnetic resonance imaging coil using the coil identifier, wherein the coil data comprises a predefined range of coil positioning coordinates referenced to the anatomical features;
determine an allowed range of coil coordinates by mapping the predefined range of coil positioning coordinates to the current coordinate system using the set of subject coordinates and the anatomical features;
determine whether the set of coil coordinates is within the allowed range of coil coordinates in the current coordinate system;
provide a warning signal indicating a mismatch between the set of coil coordinates and the allowed range of coil coordinates when the set of coil coordinates is not within the allowed range of coil coordinates.

18. The medical system of claim 17, the execution of the machine executable instructions further causing the computational system to provide the start signal only when the set of coil coordinates is within the allowed range of coil coordinates.

19. The medical system of claim 17, the machine executable instructions further causing the computational system to:
obtain a predicted specific absorption rate calculated to be experienced by the subject in a posture described by the set of subject coordinates if the magnetic resonance imaging system executes a planned magnetic resonance imaging scan using the magnetic resonance imaging coil at the coil location, the coil data further comprising a specific absorption rate safety value specific to the magnetic resonance imaging coil; and
provide the start signal only if the predicted specific absorption rate does not exceed the specific absorption rate safety value.

20. The medical system of claim 17, further comprising a magnetic resonance imaging system configured to acquire medical image data of the subject using the magnetic resonance imaging coil in response to receiving a start signal from the computational system, the execution of the machine executable instructions further causing the computational system to provide a start signal from the computational system to the magnetic resonance imaging system if the set of coil coordinates is within the allowed range of coil coordinates in the current coordinate system, provide a start signal from the computational system to the magnetic resonance imaging system.

* * * * *